(12) United States Patent
Wang et al.

(10) Patent No.: US 9,706,279 B2
(45) Date of Patent: Jul. 11, 2017

(54) ELECTRONIC DEVICE

(71) Applicant: Hisense Electric Co., Ltd., Qingdao (CN)

(72) Inventors: An Wang, Qingdao (CN); Tianhua Wang, Qingdao (CN); Weicai Huang, Qingdao (CN); Zongshen Guo, Qingdao (CN); Shaowei Liu, Qingdao (CN); Chao Zhang, Qingdao (CN); Anming Guo, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 70 days.

(21) Appl. No.: 14/717,222

(22) Filed: May 20, 2015

(65) Prior Publication Data
US 2016/0105739 A1      Apr. 14, 2016

(30) Foreign Application Priority Data
Oct. 10, 2014   (CN) .......................... 2014 1 0532248

(51) Int. Cl.
    *H04R 9/06*      (2006.01)
    *H04R 1/02*      (2006.01)
    (Continued)

(52) U.S. Cl.
    CPC ........... *H04R 1/028* (2013.01); *G06F 1/1688* (2013.01); *H04N 5/642* (2013.01); *H04R 1/24* (2013.01);
    (Continued)

(58) Field of Classification Search
    CPC ... H04R 9/06; H04R 9/02; H04R 1/22; H04R 1/62; H04R 1/02; H04R 1/025;
    (Continued)

(56) References Cited

U.S. PATENT DOCUMENTS

| 6,912,290 B1* | 6/2005 | Thorsell | H04R 1/2826 181/185 |
| 2002/0099891 A1* | 7/2002 | Cole | G06F 1/1616 710/200 |

(Continued)

FOREIGN PATENT DOCUMENTS

| CN | 201039445 Y | 3/2008 |
| CN | 201219304 Y | 4/2009 |

(Continued)

*Primary Examiner* — Leshui Zhang
(74) *Attorney, Agent, or Firm* — Harness, Dickey & Pierce, P.L.C.

(57) ABSTRACT

The present disclosure provides an electronic device, which includes a display module and a speaker, the speaker is placed on the back surface of the display module, and the device includes a mainboard component and a power panel component placed on the back surface of the display module; the speaker is placed below the mainboard component and the power panel component, the speaker includes a speaker body, an inverter tube, a first loudspeaker for producing mediant or bass, a second loudspeaker for producing mediant or treble, a sound producing surface of the first loudspeaker is placed on the surface of the speaker body back to the display module, and a sound producing surface of the second loudspeaker is placed on the lower surface of the speaker body.

19 Claims, 6 Drawing Sheets

(51) Int. Cl.
  *H04R 1/24* (2006.01)
  *G06F 1/16* (2006.01)
  *H04N 5/64* (2006.01)
  *H04R 1/26* (2006.01)
  *H04R 1/28* (2006.01)
  *H04R 5/02* (2006.01)

(52) U.S. Cl.
  CPC .............. *H04R 1/26* (2013.01); *H04R 1/2857* (2013.01); *H04R 5/02* (2013.01); *H04R 2205/021* (2013.01); *H04R 2499/15* (2013.01)

(58) Field of Classification Search
  CPC . H04R 1/26; H04R 1/028; H04R 1/24; H04R 1/323; H04R 2499/11; H04R 2499/15; H04R 5/02; H04R 2205/021; H04R 2420/07; G10H 1/16; H03G 3/00; H04B 1/082
  USPC ....... 381/333, 334, 335, 336, 152, 337, 338, 381/339, 345, 348, 352, 165, 373, 374, 381/382, 385, 386, 387, 388, 389, 395; 348/423.1; 352/9, 10
  See application file for complete search history.

(56) References Cited

U.S. PATENT DOCUMENTS

2005/0129263 A1\* 6/2005 Tamura ................ H04N 5/642
                                           381/333
2005/0145434 A1   7/2005 Thorsell et al.

FOREIGN PATENT DOCUMENTS

CN        201332469 Y     10/2009
CN        202587345 U     12/2012

\* cited by examiner

ELECTRONIC DEVICE

CROSS-REFERENCE TO RELATED APPLICATION

This application claims the benefit and priority of Chinese Patent Application No. 201410532248.2 filed Oct. 10, 2014. The entire disclosure of the above application is incorporated herein by reference.

FIELD

The present disclosure relates to the field of electronic technology, and particularly relates to an electronic device.

BACKGROUND

This section provides background information related to the present disclosure which is not necessarily prior art.

It has been more and more popular to take electronic equipments as one important audio-video equipments. By taking TV as an example, TV not only can provide users with clear images, but also can provide users with audio effect of high fidelity, wherein a speaker is an indispensable component to provide audio. Ordinarily, an external speaker is bulky in size, and needs to be connected specially to electronic devices, which is not convenient for users to use. Therefore, for an ordinary electronic equipment, a speaker is integrated into the electronic equipment.

SUMMARY

This section provides a general summary of the disclosure, and is not a comprehensive disclosure of its full scope or all of its features.

In an aspect, some embodiments of the present disclosure provide an electronic device, which includes a display module and a speaker, the speaker is placed on the back surface of the display module, and the device includes a mainboard component and a power panel component placed on the back surface of the display module; the speaker is placed below the mainboard component and the power panel component, the speaker includes a speaker body, an inverter tube, a first loudspeaker for producing mediant or bass, a second loudspeaker for producing mediant or treble, a sound producing surface of the first loudspeaker is placed on the surface of the speaker body back to the display module, and a sound producing surface of the second loudspeaker is placed on the lower surface of the speaker body, one end of the inverter tube is placed on the lower surface of the speaker body, and the other end of the inverter tube is placed inside of the speaker body.

In another aspect, some embodiments of the present disclosure provide an electronic device, which includes a display module and a speaker, the speaker is placed on the back surface of the display module, and the length of the speaker is no more than one third of the length of the electronic device, and the width of the speaker is no more than one third of the width of the electronic device; the speaker includes a speaker body, an inverter tube and at least one loudspeaker, one end of the inverter tube is placed on the lower surface of the speaker body, and the other end of the inverter tube is placed inside of the speaker body, the distance between one end of the inverter tube and the sound producing surface of one of the at least one loudspeaker is no more than 300 mm.

In still another aspect, some embodiments of the present disclosure provide an electronic device, which includes a display module and a speaker, the speaker is placed on the back surface of the display module, and the length of the speaker is no more than one third of the length of the electronic device, and the width of the speaker is no more than one third of the width of the electronic device; the speaker includes a speaker body, an inverter tube and at least one loudspeaker, one end of the inverter tube is placed on one side of the speaker body, the other end of the inverter tube is placed inside of the speaker body, the distance between one end of the inverter tube and the sound producing surface of one of the at least one loudspeaker is no more than 300 mm.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 13:
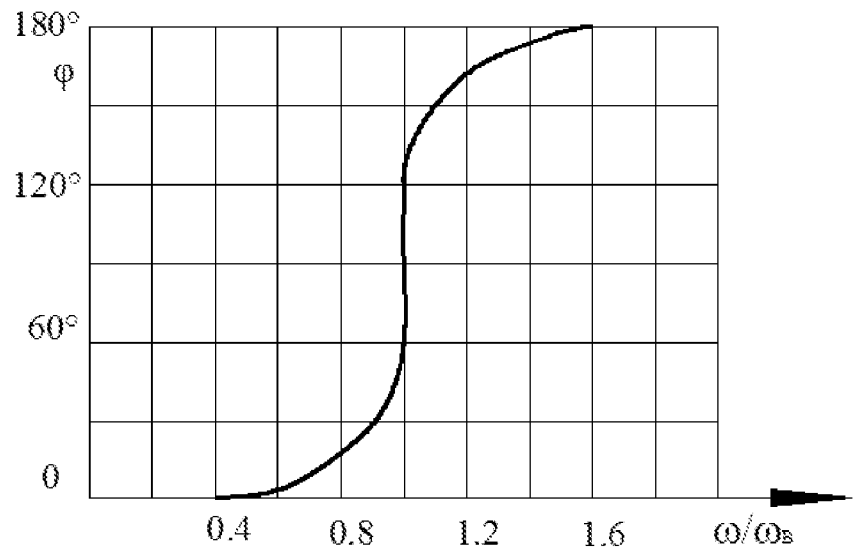

FIG. 13 a curve graph of $\phi$ changing along with $\omega/\omega_B$ in the speaker of an electronic device according to an embodiment of the present disclosure.

Corresponding reference numerals indicate corresponding parts throughout the several views of the drawings.

DETAILED DESCRIPTION

Example embodiments will now be described more fully with reference to the accompanying drawings.

The technical solution according to embodiments of the present disclosure will be described below, and with reference to the drawings in embodiments of the present disclosure, and embodiments described below are merely a part but not all of the embodiments. All of the other embodiments, obtained by those of ordinary skills in the art based on the embodiments of the present disclosure without any inventive efforts, fall into the protection scope of the present disclosure.

It shall be understood that, in the description of the present disclosure, the terms "center", "above", "below", "front", "back", "left", "right", "vertical", "horizontal", "top", "bottom", "inside" and "outside", etc. representing directions or relations in positions are directions or relations in positions according to the drawings, which are merely used to describe the present disclosure expediently and briefly, and are not to expressly or implicitly indicate such devices or components shall be in certain directions, certain positions and operations, and these shall not be construed to limit the scope of the present disclosure.

The terms "first", "second" and "third" are used only for descriptive purposes. It shall not be understood that such terms expressly or implicitly indicate relative importance or implicitly suggest the number of features described. Therefore, feature limited by "first", "second" and "third" may expressly or implicitly include one or more such features. In the description of the present disclosure, unless stated otherwise, "more" means two or more than two.

Figure 1:
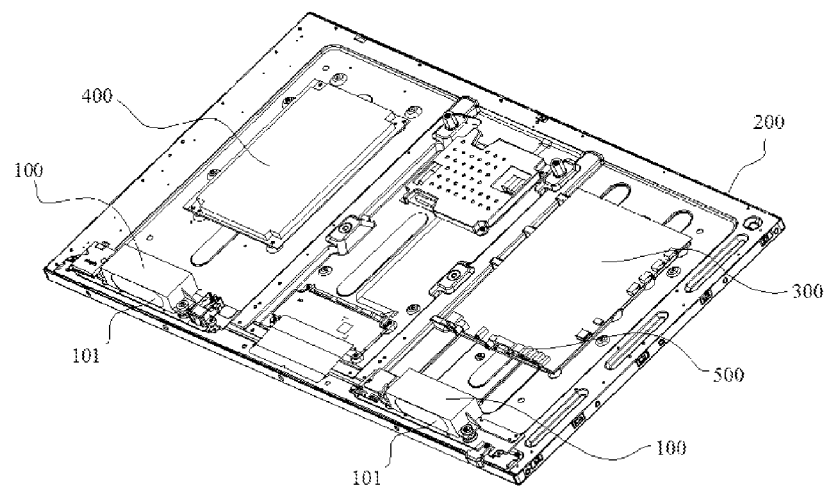
FIG. 1 is a schematic structural diagram of the electronic device being a television.
Figure 2:
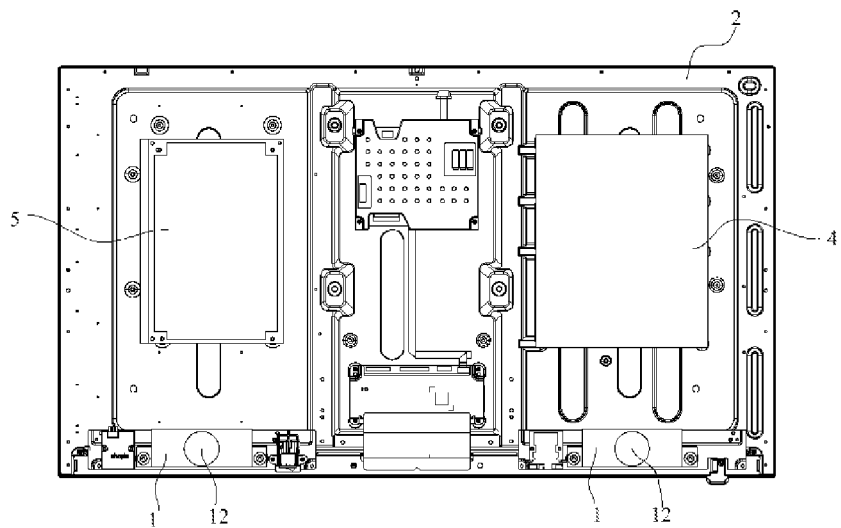
FIG. 2 is a schematic structural diagram of an electronic device according to an embodiment of the present disclosure.
Figure 3:
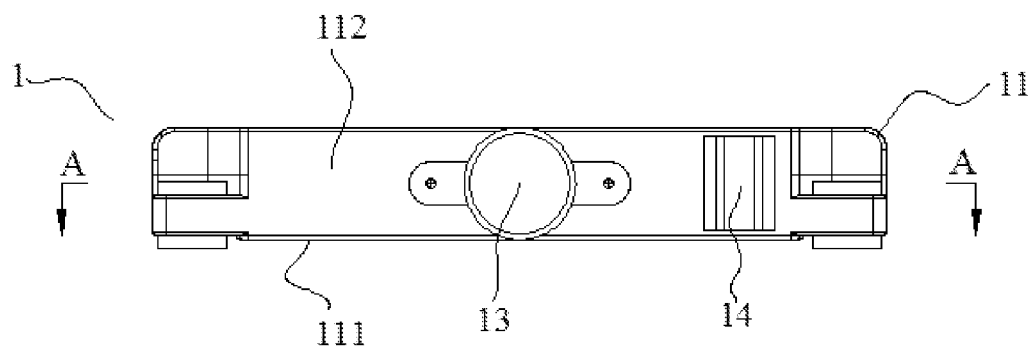
FIG. 3 is an upward view of the speaker of an electronic device according to an embodiment of the present disclosure.
Figure 4:
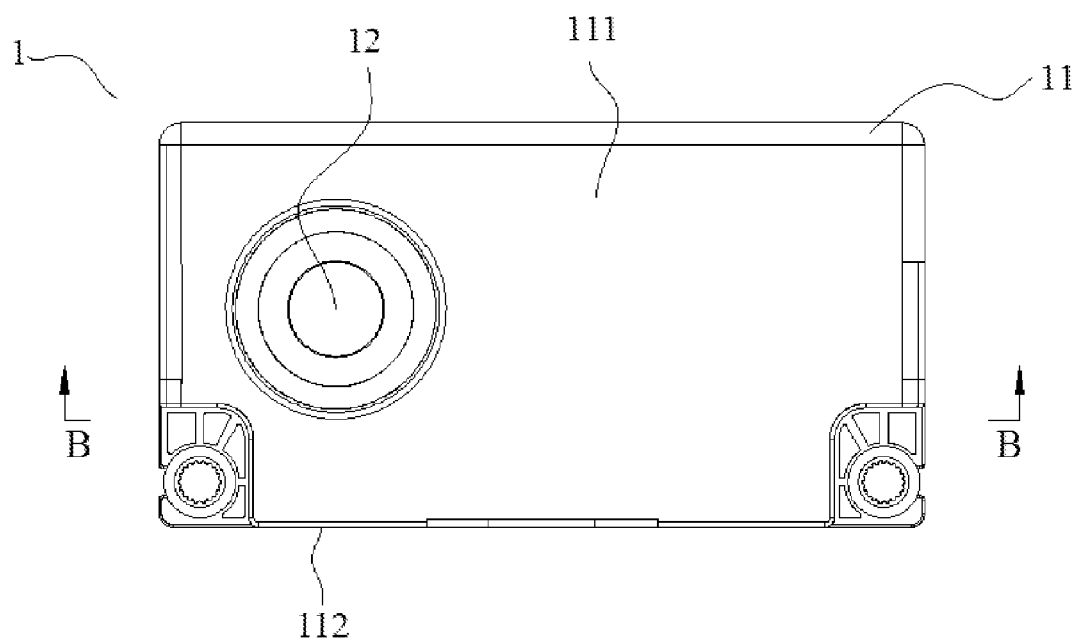
FIG. 4 is a front view of the speaker of an electronic device according to an embodiment of the present disclosure.

Using an electronic device as an example: the speaker of the electronic device ordinarily includes a speaker body and a loudspeaker, as shown in FIG. 1. The speaker 100 is placed on the back surface of the display module 200, the back surface of the display module may be the surface back to the user, or may be the surface other than the display surface of the display module. The lower surface of the speaker body 100 is vertical to the ground. As the electronic device is relatively thin, a mainboard component 300 and a power panel component 400 need to be placed on the back surface of the display module, and the speaker 100 ordinarily is placed below the mainboard component 300 and the power panel component 400, therefore, the space on the display module to place the speaker 100 is very limited. In addition, an interface 500 is provided on the mainboard component 300 for the connection of lines, and some space needs to be reserved on the display module for lines, therefore, the space to place the speaker 100 inside a thin electronic device is very limited.

Some embodiments of the present disclosure provide an electronic device, and such electronic devices include but are not limited to TVs, tablets, or mobile phones, etc.

As shown in FIGS. 2-6, FIG. 2 is a schematic structural diagram of an electronic device according to an embodiment of the present disclosure. The electronic device includes a display module 2 and a speaker 1. The speaker 1 is placed on the back surface of the display module 2. A mainboard component 4 and a power panel component 5 are placed on the back surface of the display module 2. The speaker 1 is placed below the mainboard component 4 and the power panel component 5. The speaker 1 includes a speaker body 11, a first loudspeaker 12, a second loudspeaker 13, and an inverter tube 14. The speaker body 11 may be in rectangular shape. The first loudspeaker 12 may be in round shape, or, the second loudspeaker 13 may be in round shape, or both of the first and the second loudspeakers may be in round shape. The first loudspeaker 12 may produce mediant or bass. The sound producing surface of the first loudspeaker 12 may be placed on the back surface 111 of the speaker body 11. The second loudspeaker 13 may produce mediant or treble. The sound producing surface of the second loudspeaker 13 may be placed on the lower surface 112 of the speaker body 11. One end of the inverter tube 14 may be placed on the lower surface 112 of the speaker body 11, the other end of the inverter tube may be placed inside of the speaker body 11. The inverter tube 14 may connect the inside of the speaker body 11 with the outside of the speaker body 11. The back surface 111 of the speaker body 11 may be a surface on the speaker body 11 which is back to the display module 2, and the lower surface 112 of the speaker body 11 may be vertical to the ground.

Some embodiments of the present disclosure provide an electronic device, which includes a display module 2 and a speaker 1. The speaker 1 is placed on the back surface of the display module 2. The sound producing surface of the first loudspeaker 12 is placed on the back surface 111 of the speaker body 11, and the sound producing surface of the second loudspeaker 13 is placed on the lower surface 112 of the speaker body 11, instead of placing both of the sound producing surfaces of the first and the second loudspeakers on the lower surface 112 of the speaker body 11. By doing so, the back surface 111 and the lower surface 112 of the speaker body 11 may be utilized separately to produce sound, thus, the size of the sound producing surface of the first loudspeaker and the sound producing surface of the second loudspeaker may be designed to be larger, without increasing the size of the speaker 1, to thereby enhance the sound effect of the speaker 1, and to enhance the sound effect of the electronic device. Comparing with oval shape loudspeaker which has different major and minor axes, the sound producing surface of a round shape loudspeaker has a fixed radius, thus, the round shape loudspeaker may give out the sound more evenly, and have a better sound effect. In some embodiments of the present disclosure, both the first loudspeaker 12 and second loudspeaker 13 are round shape, to enhance the sound effect of the speaker 1. Because bass is lower in directivity, that is, bass travels more divergently, the first loudspeaker 12 may be placed to produce mediant and bass back to the user, which may have a small impact on receiving, by the user, mediant and bass. Because treble is higher in directivity, that is, treble travels more convergently, the second loudspeaker 13 may be placed to produce mediant and treble vertically down to the ground, thus, the place for producing mediant and treble is closer to the user, and may transmit mediant and treble to the user easier, and reduce the loss of mediant and treble during the transmission to user. From above, the electronic device not only enhances the sound effect, but also avoids increasing the size of the speaker as well. In addition, because one end of the inverter tube 14 is placed on the lower surface 112 of the speaker body 11, and the other end of the inverter tube 14 is inside of the speaker body 11, the electronic device not only can produce mediant and bass back to the user using the first loudspeaker, but also can produce mediant ad bass vertically down to the ground through the inverter tube 14. By doing this, the transmission loss of mediant and bass produced by the first loudspeaker 12 may be compensated by the mediant and bass produced by the inverter tube. In addition, mediant produced by the inverter tube 14 may be superimposed to the mediant from the sound producing surface of the second loudspeaker 13, to enhance the mediant effect of the electronic device. In addition, because the speaker box has a rectangular shape, the speaker has substantial distance on the vertical side, placing one end of the inverter tube 14 on the lower surface of the speaker body 11 may help to place longer inverter tube 14 in the speaker body 11, to enlarge the range of the selection of the length of the inverter tube 14 without increasing the size of the speaker body 11, to thereby enhance sound effect. Therefore, without increasing the size of the speaker, the sound effect of electronic device may be enhanced.

The principle of enhancing the mediant and bass effect by the inverter tube 14 may be as follows:

$U_C$ indicates the volume velocity of the diaphragm of the speaker; $U_P$ indicates the volume velocity of air inside the inverter tube 14; $R_{AB}$ indicates the acoustic impedance of the speaker body 11; $C_{AT}$ indicates the acoustic compliance of the speaker body 11; $M_{AB}$ indicates the mass loading of the back surface of the diaphragm of the loudspeaker; $R_{AP}$ indicates the acoustic impedance of the inverter tube 14; $M_{AP}$ indicates the acoustic mass of the inverter tube 14; $R_{AR2}$ indicates the acoustic radiation impedance in front of the inverter tube 14; $M_{AR2}$ indicates the radiation mass in front of the inverter tube 14; w indicates the angular frequency of the sound produced by the loudspeaker; and $\omega_B$ indicates the angular frequency of the sound inside the speaker body 11.

Figure 11:
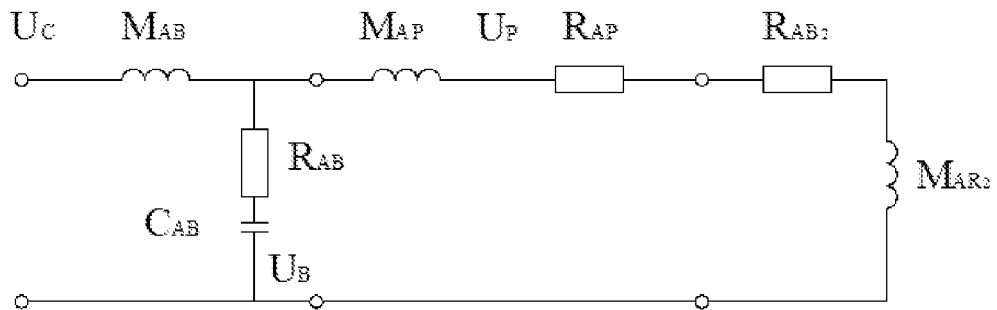
FIG. 11 is an equivalent acoustic circuit of the speaker of an electronic device according to an embodiment of the present disclosure.

When the diaphragm of the loudspeaker vibrates, the sound wave moving to the outside air is produced, and the air inside the speaker body 11 is vibrated to produce sound wave inside the speaker body, the sound wave inside the speaker body travels out of the speaker body 11 through the inverter tube 4. Therefore, the sound emitting end of the inverter tube 14 may be regarded as a diaphragm radiating sound to the surroundings. FIG. 11 illustrates an equivalent acoustic circuit of the speaker of an electronic device when the sound wave is in medium or low frequency.

Figure 12:
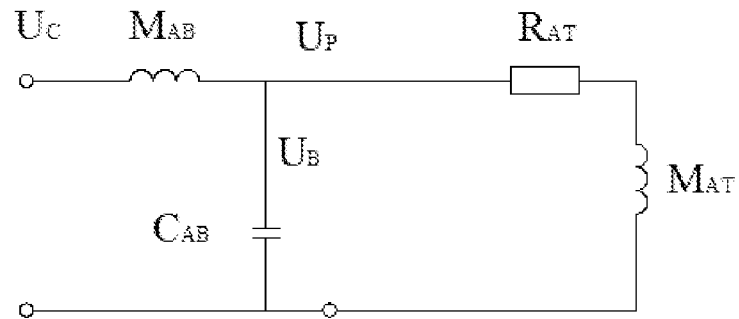
FIG. 12 is a simplified circuit diagram of the circuit in FIG. 11.

Because $R_{AB}$ is small and may be neglected, the circuit in FIG. 11 may be simplified as the circuit in FIG. 12, herein $R_{AT}=R_{AP}+R_{AR2}$, $M_{AT}=M_{AP}+R_{AR2}$;

The loop in FIG. 12 shows: $U_P[R_{AT}+j\omega M_{AT}]+(U_P-U_C)/j\omega C_{AB}=0$, then $U_C/U_P=j\omega C_{AB}[R_{AT}+j\omega M_{AT}+1/j\omega C_{AB}]=j\omega C_{AB}R_{AT}-\omega^2 M_{AT}C_{AB}+1$;

$\omega_B=1/\sqrt{M_{AT}C_{AB}}$, then $U_C/U_P=j\omega C_{AB}R_{AT}-(\omega^2/\omega_B^2+1)=(1-\omega^2/\omega_B^2)+j\omega C_{AB}R_{AT}$.

It can be seen that, $U_C/U_P$ is a plural, which indicates that there is a difference in phase $\phi$ between the sound, produced by the diaphragm of the loudspeaker, inside the speaker body 11 and the sound, produced by the diaphragm of the loudspeaker, radiating to the outside of the speaker body 11.

$\text{tg}\phi=\omega C_{AB}R_{AT}/(1-\omega^2/\omega_B^2)$ or $\phi=\text{tg}^{-1}\omega C_{AB}R_{AT}/(1-\omega^2/\omega_B^2)$.

As illustrated in FIG. 13, the curve in FIG. 13 indicates the relationship between $\phi$ and $\omega/\omega_B$, and according the principles of Helmholtz resonator, as long as $\omega \geq \omega_B$ and $\phi \geq 90°$, the inverter tube 14 may emit sound that is in the same phase as the sound, produced by the diaphragm, radiating to the outside of the speaker body 11, to utilize the sound in the speaker body 11 to enhance the mediant and bass sound effect, herein $\omega_B$ represents inverter frequency.

The principle of superposition of two sound waves:

$P_1$ and $P_2$ separately represent two sound waves; P represents a sound wave being the superposition of $P_1$ and $P_2$; $\omega$ represents angular frequency; t represents time; $\phi$ represents phase angle; $\phi_1$ represents the phase angle of $P_1$; $\phi_2$ represents the phase angle of $P_2$; $P_a$ represents the amplitude of P; $P_{1a}$ represents the amplitude of $P_1$; $P_{2a}$ is the amplitude of $P_2$; L represents the sound pressure level; $L_{pa}$ represents the sound pressure level of the superimposed sound wave, $L_{pa1}$ represents the sound pressure level of $P_1$; and $P_0$ represents the reference sound pressure level.

$P_1=P_{1a}\cos(\omega t-\phi_1)$. $P_2=P_{2a}\cos(\omega t-\phi_2)$;

then $P=P_1+P_2=P_a\cos(\omega t-\phi)$;

therefore, $P_a^2=P_{1a}^2+P_{2a}^2+2P_{1a}P_{2a}\cos(\phi_1\phi_2-\phi_1)$;

When $\phi_2-\phi_1=0$, $P_a^2=P_{1a}^2+P_{1a}P_{2a}=(P_{1a}+P_{2a})^2$, and $L=20\lg(P/P_0)$, then $L_{pa}=20\lg(P_a/P_0)=20\lg(2P_{1a}/P_0)=20\lg 2+20\lg(P_{1a}/P_0)=6+L_{pa1}$, it can be seen that, when the two sound waves have the same phase angle, the sound pressure level of the superimposed sound wave increases 6 dB.

When $\phi_2-\phi_1=\pi/2$, $L_{pa}=L_{pa1}+3$ dB, it can be seen that, when the two sound waves have a phase angle difference of 90 degree, the sound pressure level of the superimposed sound wave increases 3 dB.

When $\phi_2-\phi_1=\pi$, $P_a^2=0$, it can be seen that, when the two sound waves have a phase angle difference of 180 degree, the sound is counteracted after superimposed.

If the sound could be transmitted from inside of the speaker body 11 via the inverter tube 14, and could be in the same phase of the sound produced by the first loudspeaker 12, the sensitivity of the speaker 1 may be increased to the greatest extent, and in theory, such extent could be 6 dB, and in practical experiments, the inverter tube 14 may increase the sensitivity of the speaker 1 by 2-4 dB.

One or more speakers 1 may be used. For example, two speakers may be used, one placed below the mainboard component 4 and one placed below the power panel component 5 of the display module 2, and the two speakers are symmetrically placed on the two sides of the display module, allowing users to receive sound using both ears and further enhancing the sound effect.

Figure 5:
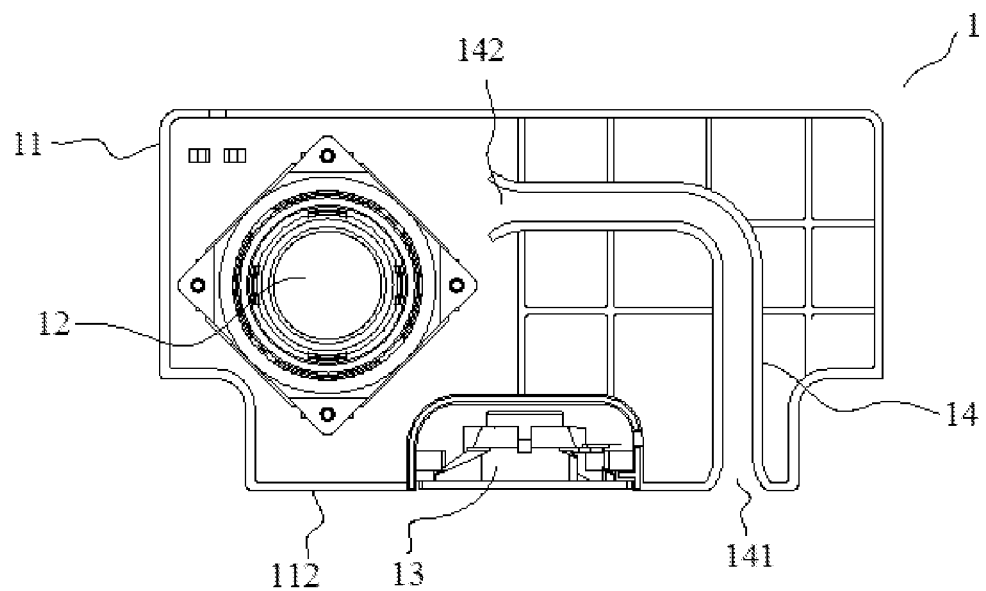
FIG. 5 is an A-A cutaway view of FIG. 3.
Figure 6:
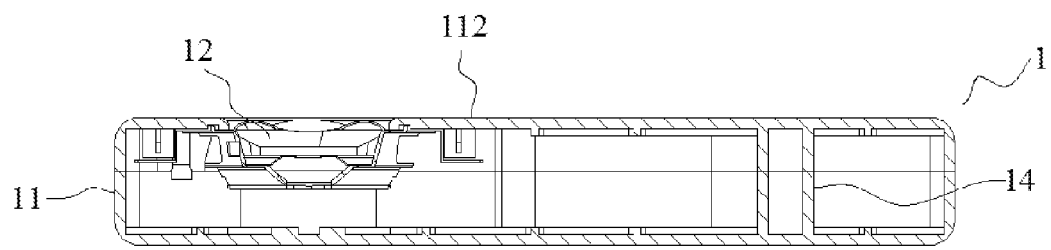
FIG. 6 is a B-B cutaway view of FIG. 4.

As shown in FIG. 5, the space within the electronic device is relatively small, and mainboard component 4 and power panel component 5 need to be placed on the back surface of the display module 2, therefore, the space left on the back surface of the display module 2 to place speaker 1 is very limited. The mainboard component 4, the power panel component 5, base support 6, external receiver 7 and other components limit the size of the speaker 1, making the speaker body of speaker 1 relatively small, the space left inside the speaker body 11 to place the inverter tube 14 is hence small. The length of the inverter tube 14 directly influences the sound effect of the mediant and bass sound transmitted via the inverter tube. In a certain space, straight tube has limited reach in length, while curved tube may be much longer. Therefore, in a condition that the speaker body 11 is small, curved inverter tube 14 may still reach a proper length, by using curved inverter tube 14, in order to reduce the size of the speaker body 11, and make the electronic device thinner.

As shown in FIG. 5, the inverter tube 14 could be a round tube, a square tube, a flat tube or other inverter tubes that are capable of transmitting mediant and bass sound that are of the same phase as the mediant and bass sound produced by the first loudspeaker 12. The area size of the cross section of the inverter tube 14 directly influences the sound effect of the mediant and bass sound transmitted via the inverter tube 14. However, in order to make the electronic device thinner, the speaker 1 and the speaker body 11 are ordinarily thin in their shape. In a thin speaker body 11, the cross section space to accommodate a round tube or a square tube is small, while the cross section space to accommodate a flat tube is bigger. Without increasing the size of the speaker body 11, a round tube and a square tube limit the selection of the cross section area size of the inverter tube 14, but a flat tube allows the cross section area size to be larger, therefore, the inverter tube 14 may be a flat tube, and the cross section of the inverter tube may be rectangle or oval and so on.

As shown in FIG. 5, the end of the inverter tube 14 on the lower surface 111 of the speaker body 11 has a first opening 141. The end of the inverter tube 14 inside the speaker body 11 has a second opening 142. The inverter tube 14 connects the outside of the speaker body 11 via the first opening 141, and connects the inside of the speaker body 11 via the second opening 142. When sound waving is travelling into or out of the first opening 141, if the outside edge of the first opening 141 and the second opening 142 has some sharp angles, it may interfering the sound wave and cause air sound, which lower the clarity and definition of the sound. Therefore, chamfer angles are set on both the first opening 141 and the second opening 142, making both the first opening 141 and the second opening 142 be trumpet shape openings, and smoothing the outside edges of the first opening 141 and the second opening 142, to increase the clarity and definition of the sound, and further improve the sound effect of the electronic device.

On the lower surface 112 of the speaker box 11, both of the sound producing surfaces of the second loudspeaker 13 and the inverter tube 14 can produce mediant sound in the same phase. However, if the sound producing surface of the second loudspeaker 13 is far from the inverter tube 14, the superimposing effect is not good. If the sound producing surface of the second loudspeaker 13 is close to the inverter tube 14, the superimposing effect is good because the second loudspeaker 13 and the inverter tube 14 produce sound in a relatively same location. Therefore, to better superimpose the mediant sound from the second loudspeaker 13 to the mediant sound of the inverter tube 14, and to better enhance the sound effect of mediant sound, the distance between the inverter tube 14 and the sound producing surface of the second loudspeaker 13 may be less than 300 mm. and in some embodiments, for example, such distance is no more than 10 mm. It can further enhance the sound effect of the electronic device.

There may be one or more inverter tubes 14. If there are several inverter tubes 14, the end of each inverter tube 14 may be placed on the lower surface 112 of the speaker body 11, together with the sound producing surface of the second loudspeaker 13; or, there is at least one inverter tube, in those inverter tubes 14, with one end placed on the lower surface 112 of the speaker body 11, together with the sound producing surface of the second loudspeaker 13, in order to enhance the sound effect of the electronic device.

The inverter tube 14 and the speaker body 11 may be separate components, or they may be a unibody component. When the inverter tube 14 and the speaker body 11 are separate components, it requires special installation, and is not convenient, therefore, the inverter tube 14 and the speaker body 11 may be built into one component.

The length of the inverter tube 14 is limited by the size of the speaker body 11. In order to make the electronic device thinner, the size of the speaker body 11 is relatively small, and if the inverter tube 14 is too long or too short, the sound transmitted by the inverter tube 1 may be affected, therefore, to make the electronic device thinner while protecting the sound effect, the length of the inverter tube 14 may be no less than 60 mm and no more than 200 mm.

Figure 7:
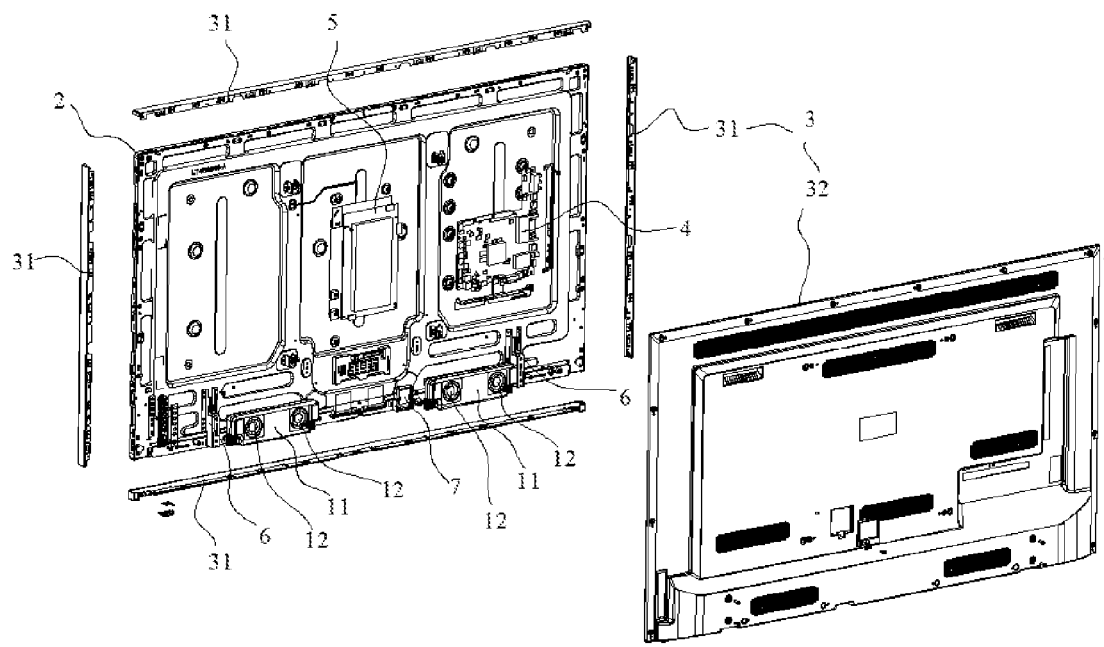
FIG. 7 is a schematic structural diagram of an electronic device according to an embodiment of the present disclosure.
Figure 8:
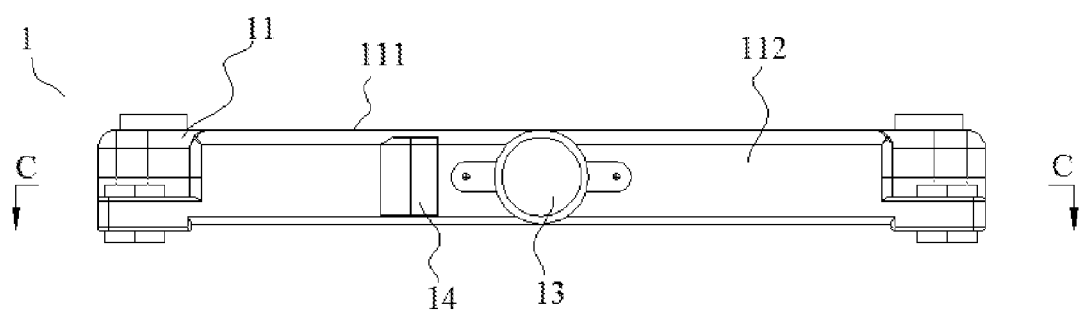
FIG. 8 is an upward view of the speaker of an electronic device according to an embodiment of the present disclosure.
Figure 9:
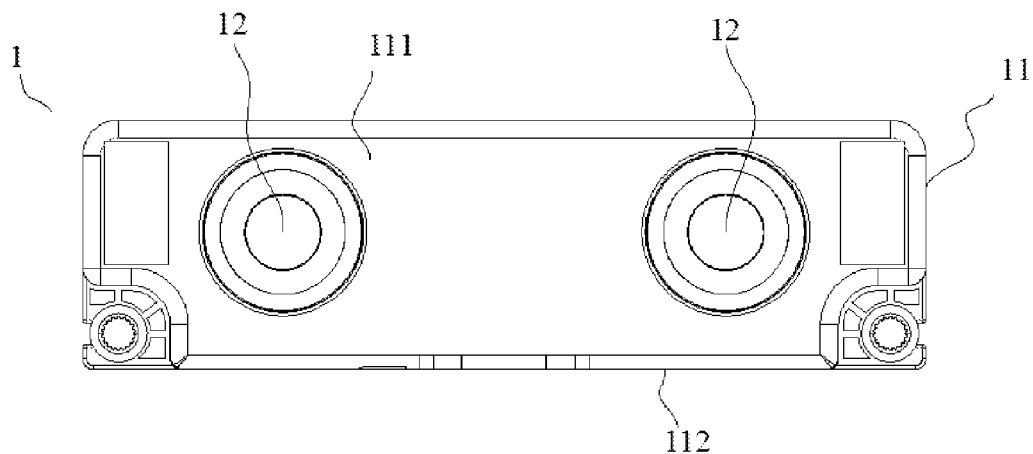
FIG. 9 is a front view of the speaker of an electronic device according to an embodiment of the present disclosure.
Figure 10:
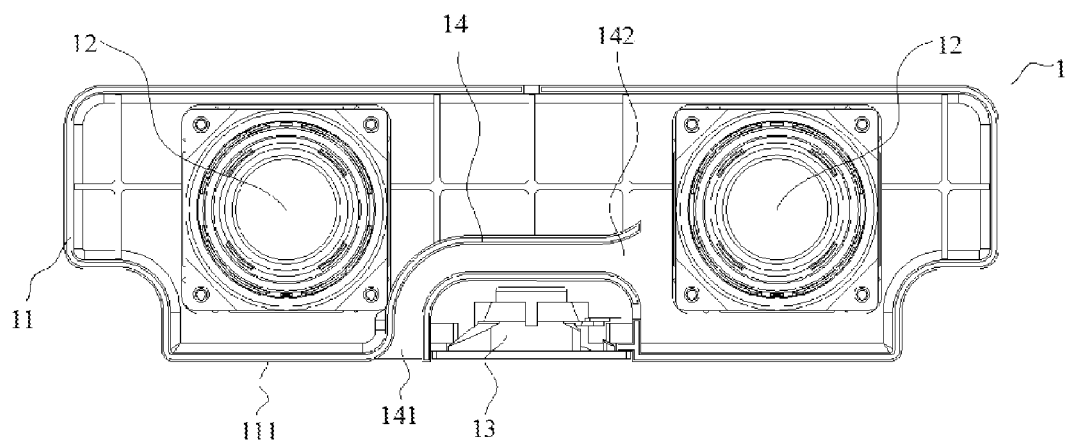
FIG. 10 is a C-C cutaway view of FIG. 8.

To further enhance the sound effect, there may be multiple first loudspeakers 12 and multiple second loudspeakers 13. For example, two first loudspeakers 12 may be placed in the speaker body 11, as shown in FIGS. 7-10. Some other embodiments in FIG. 7 provide another electronic device, which includes a display module 2 and a speaker 1. The speaker 1 is placed on the back surface of the display module 2. Other components including a mainboard component 4, a power panel component 4, a base frame 6 and an external receiver 7 are also placed on the back surface of the display module 2. The speaker 1 includes a speaker body 11, first loudspeakers 12, second loudspeakers 13 and an inverter tube 14. The first loudspeakers 12 and the second loudspeakers 13 may be round shape. There are two second loudspeakers 13, both of which may produce mediant and treble. The sound producing surfaces of the second loudspeakers 13 are placed on the lower surface 112 of the speaker body 11. One end of the inverter tube 14 is placed on the lower surface 112 of the speaker body 11, and the other end is placed inside the speaker body 11, and the end of the inverter tube 14 inside the speaker tube 11 is placed between the two first loudspeakers 12.

As shown in FIG. 7, the electronic device includes a shell 3, a middle frame 2 is placed in the shell 3. The shell 3 includes a front shell 31 (which is the side frame of the electronic device) and a rear shell 32. An internal speaker 1 is fixed to the lower back side of the middle frame 2 which is also inside of the rear shell 32.

It is to be noted that, in above embodiments, second loudspeakers 13 may be replaced with oval shape loudspeakers, which may make the speaker 1 thinner.

In addition, some embodiments of the present disclosure provide an electronic device (not shown in the drawings), which includes a display module and a speaker. The speaker is placed on the back surface of the display module. The length of the speaker is no more than one third of the length of the electronic device, and the width of the speaker is no more than one third of the width of the electronic device. The speaker includes a speaker body, an inverter tube and at least one loudspeaker. One end of the inverter tube is placed on the lower surface of the speaker body, and the other end of the inverter tube is placed inside of the speaker body. The distance between one end of the inverter tube and the sound producing surface of one of the at least one loudspeaker is no more than 300 mm. The speaker may be placed anywhere in the electronic device, for example it may be placed on the lower back side of the display module of the electronic device.

One end of the inverter tube 14 is placed on the lower surface of the speaker body, and the other end is placed inside the speaker body, allowing the electronic device to transmit sound vertically down via the inverter tube, to superimpose the sound transmitted by the inverter tube with the sound from the sound producing surface of at least one loudspeaker, to thereby enhance the sound effect of the whole electronic device.

Considering that the length of the inverter tube 14 may affect the sound effect of the sound transmitted from the inverter tube 14, and that within a certain space, the length of a straight tube is limited but a curved tube may be longer, in some embodiments the inverter tube may be a curved tube, to reduce the size of the speaker body and to make the electronic device thinner.

In addition, in some embodiments, the cross section of the inverter tube may be in rectangular or oval shape.

In some embodiments, at least one of the loudspeakers may be in round shape, or in oval shape. Compared with the loudspeakers in other shapes that have different lengths in major and minor axis, the sound producing surface of a round shape loudspeaker has a fixed radius, thus, the round shape loudspeakers may produce sound evenly to the surrounding. Therefore, the sound produced by round shape loudspeaker is better, thereby making the sound of the speaker better.

In some embodiments, the position phase of the sound from the inverter tube may be same as the sound phase of the sound produced by at least one of the loudspeakers. Sound in the same phase may enhance the sound effect, to thereby enhance the sound effect of the electronic device.

In some embodiments, the end of the inverter tube which is placed on the lower surface of the speaker body has a first opening. The end of the inverter tube inside the speaker body has a second opening. The inverter tube connects to the outside of the speaker body using the first opening, and connects the inside of the speaker body via the second opening. In addition, the outside edge of the first opening may have a chamfer angle, and/or the outside edge of the second opening may have a chamfer angle. The first and/or the second opening may be in trumpet shape, making the outside edges of the first and second openings more smooth, to provide the sound clarity and definition and to further enhance the sound effect of the electronic device.

Furthermore, in some embodiments, loudspeakers may include a first loudspeaker producing mediant and bass and a second loudspeaker producing mediant and bass. The sound producing surface of the first loudspeaker is placed on the surface of speaker body back to the display module. The sound producing surface of the second loudspeaker is placed on the lower surface of the speaker body.

In another aspect, some embodiments of the present disclosure provide an electronic device (not shown in the drawings), which includes a display module and a speaker. Herein, the length of the speaker is no more than one third of the length of the electronic device, and the width of the speaker is no more than one third of the width of the electronic device. The speaker includes a speaker body, an inverter tube and at least one loudspeaker. One end of the inverter tube is placed on the side surface of the speaker body; the other end of the inverter tube is placed inside of the speaker body. The distance between one end of the inverter tube and the sound producing surface of one of the at least one loudspeaker is no more than 300 mm.

In some embodiments, the end of the inverter tube which is placed on the side surface of the speaker body has a first opening. The end of the inverter tube inside the speaker body has a second opening. The inverter tube connects the outside of the speaker body via the first opening, and connects the inside of the speaker body via the second opening.

In other embodiments, the inverter tube may be a curved tube. The cross section of the inverter tube may be rectangular or oval. At least one of the loudspeakers may be round shape. The sound phase of the sound from the inverter tube may be the same as the sound phase of the sound produced by at least one of the loudspeakers. In addition, the outside edge of the first opening may have a chamfer angle, and/or the outside edge of the second opening may have a chamfer angle. Alternatively, the loudspeakers may include a first loudspeaker producing mediant and bass and a second loudspeaker producing mediant and bass. The sound producing surface of the first loudspeaker is placed on the surface of speaker body back to the display module. The sound producing surface of the second loudspeaker is placed on the lower surface of the speaker body. Reference may be made from the above embodiments, and a repeated description thereof will be omitted here.

Other structure of the electronic device provided in embodiments of the present disclosure is well known by those skilled in the art, and does not need to be described in detail here.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electronic device comprising:
a display module; and
a speaker, the speaker disposed on a back surface of the display module, a mainboard component and a power panel component disposed on the back surface of the display module, the speaker disposed below the mainboard component and the power panel component, the speaker comprising:
a speaker body, an inverter tube, a first loudspeaker for producing mediant or bass, and a second loudspeaker for producing mediant or treble, a sound producing surface of the first loudspeaker disposed on a surface of the speaker body facing the display module, a sound producing surface of the second loudspeaker disposed on a lower surface of the speaker body, one end of the inverter tube disposed on the lower surface of the speaker body, the other end of the inverter tube disposed inside of the speaker body.

2. The electronic device according to claim 1, wherein the inverter tube is a curved tube.

3. The electronic device according to claim 1, wherein the inverter tube is a flat tube.

4. The electronic device according to claim 3, wherein a cross section of the inverter tube is rectangular or oval.

5. The electronic device according to claim 1, wherein the first loudspeaker defines a round shape, and/or the second loudspeaker defines a round shape.

6. The electronic device according to claim 1, wherein a phase of mediant or bass from the inverter tube is the same as a phase of mediant or bass produced by the first loudspeaker.

7. The electronic device according to claim 1, wherein:
the one end of the inverter tube disposed on the lower surface of the speaker body has a first opening;
the other end of the inverter tube disposed inside of the speaker body has a second opening;
the inverter tube connects outside of the speaker body through the first opening; and
the inverter tube connects inside of the speaker body through the second opening.

8. The electronic device according to claim 7, wherein an outside edge of the first opening includes a chamfer angle, and/or an outside edge of the second opening includes a chamfer angle.

9. The electronic device according to claim 7, wherein a distance between the second opening of the inverter tube and the sound producing opening of the second loudspeaker is no more than 300 mm.

10. The electronic device according to claim 1, wherein the inverter tube is one of multiple inverter tubes in the electronic device.

11. An electronic device comprising:
a display module; and
a speaker, the speaker disposed on a back surface of the display module, a length of the speaker being no more than one third of a length of the electronic device, and a width of the speaker being no more than one third of a width of the electronic device, the speaker comprising:
a speaker body, an inverter tube, a first loudspeaker for producing mediant or bass, and a second loudspeaker for producing mediant or treble, a sound producing surface of the first loudspeaker disposed on a surface of the speaker body facing the display module, a sound producing surface of the second loudspeaker disposed on a lower surface of the speaker body, one end of the inverter tube disposed on a lower surface of the speaker body, the other end of the inverter tube disposed inside of the speaker body, a distance between the one end of the inverter tube and the sound producing surface of one of the first loudspeaker and the second loudspeaker being no more than 300 mm.

12. The electronic device according to claim 11, wherein the inverter tube is a curved tube.

13. The electronic device according to claim 11, wherein a cross section of the inverter tube is rectangular or oval.

14. The electronic device according to claim 11, wherein at least one of the first loudspeaker and the second loudspeaker defines a round shape.

15. The electronic device according to claim 11, wherein a phase of the sound from the inverter tube is the same as a phase of the sound produced by at least one of the first loudspeaker and the second loudspeaker.

16. The electronic device according to claim 11, wherein:
the one end of the inverter tube disposed on the lower surface of the speaker body has a first opening;
the other end of the inverter tube disposed inside of the speaker body has a second opening;
the first opening of the inverter tube connects outside of the speaker body; and
the second opening of the inverter tube connects inside of the speaker body.

17. The electronic device according to claim 16, wherein an outside edge of the first opening includes a chamfer angle, and/or an outside edge of the second opening includes a chamfer angle.

18. An electronic device comprising:
a display module; and
a speaker, wherein a length of the speaker being no more than one third of a length of the electronic device, and a width of the speaker being no more than one third of a width of the electronic device, the speaker comprising:
a speaker body, an inverter tube, a first loudspeaker for producing mediant or bass, and a second loudspeaker for producing mediant or treble, a sound producing surface of the first loudspeaker disposed on a surface of the speaker body facing the display module, a sound producing surface of the second loudspeaker disposed on a lower surface of the speaker body, one end of the inverter tube disposed on one side surface of the speaker body, the other end of the inverter tube disposed inside of the speaker body, a distance between the one end of the inverter tube and the sound producing surface of one of the first loudspeaker and the second loudspeaker being no more than 300 mm.

19. The electronic device according to claim 18, wherein:
the one end of the inverter tube disposed on the side surface of the speaker body has a first opening;
the other end of the inverter tube disposed inside of the speaker body has a second opening;
the first opening of the inverter tube connects outside of the speaker body; and
the second opening of the inverter tube connects inside of the speaker body.

* * * * *